(No Model.) 2 Sheets—Sheet 1.
S. W. WARDWELL, Jr.
WRENCH.
No. 573,941. Patented Dec. 29, 1896.
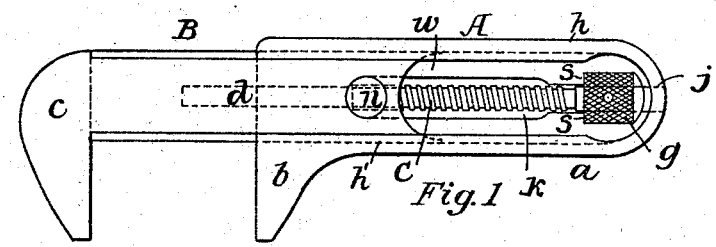
Fig. 1.
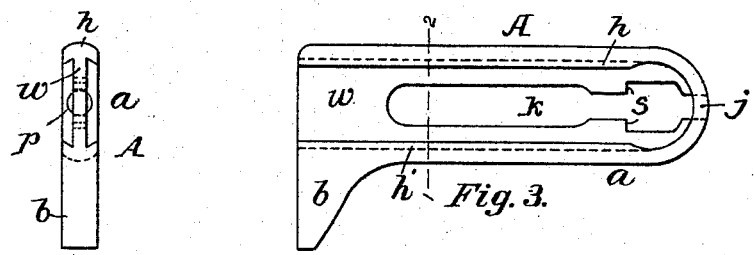
Fig. 2.   Fig. 3.
Fig. 4.   Fig. 5.
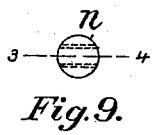 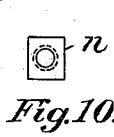 
Fig. 6.   Fig. 7.   Fig. 8.
  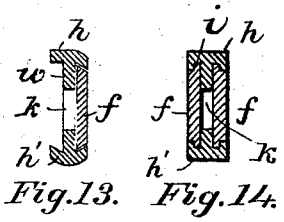
Fig. 9.   Fig. 10.   Fig. 12.   Fig. 13.   Fig. 14.
Fig. 11.
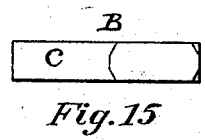 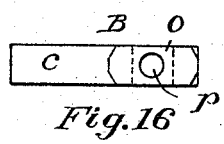 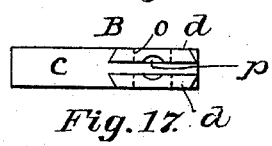
Fig. 15   Fig. 16   Fig. 17
WITNESSES:
J. G. Hinkel
E. Harrener.
INVENTOR
Simon W. Wardwell, Jr.
BY
Foster Freeman
ATTORNEYS.
THE NORRIS PETERS CO., PHOTO-LITHO., WASHINGTON, D. C.

(No Model.) 2 Sheets—Sheet 2.

S. W. WARDWELL, Jr.
WRENCH.

No. 573,941. Patented Dec. 29, 1896.

Witnesses
Inventor
Simon W. Wardwell, Jr.
By Attorneys

UNITED STATES PATENT OFFICE.

SIMON W. WARDWELL, JR., OF PROVIDENCE, RHODE ISLAND.

WRENCH.

SPECIFICATION forming part of Letters Patent No. 573,941, dated December 29, 1896.

Application filed July 6, 1896. Serial No. 598,191. (No model.)

*To all whom it may concern:*

Be it known that I, SIMON W. WARDWELL, Jr., a citizen of the United States, residing at Providence, in the county of Providence and State of Rhode Island, have invented certain new and useful Improvements in Wrenches, of which the following is a specification.

My invention relates to wrenches of that class in which the handle carries the lower jaw and the movable member carries the outer jaw; and my invention consists in providing the body member with side channels and the sliding or movable member with plates adapted to said channels, and in otherwise constructing the parts so as to simplify and cheapen the manufacture, while securing strength, durability, and greater efficiency, as fully set forth hereinafter, and as illustrated in the accompanying drawings, in which—

Figure 18:
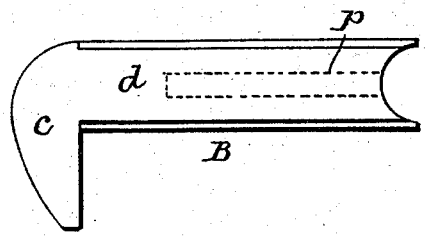
Figure 19:
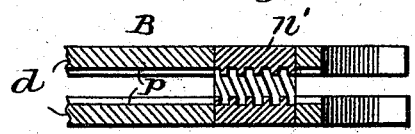

Figure 1 is a side view of my improved wrench. Fig. 2 is an end view of the body member. Fig. 3 is a face view of the body member. Fig. 4 is an edge view of the movable member in part section. Fig. 5 is an end view of the movable member. Figs. 6, 7, and 8 are views of the screw and its head detached. Fig. 9 is an end view of the screw-nut. Fig. 10 is a side view of the screw-nut. Fig. 11 is a longitudinal section of the screw-nut. Fig. 12 is a transverse section of the body member in one form; Fig. 13, the same, illustrating the construction thereof. Fig. 14 is a section showing another form. Figs. 15 to 17 are end views illustrating the progressive construction of the body member. Fig. 18 is a face view of the movable member. Fig. 19 is a sectional view of the movable member, on an enlarged scale. Figs. 20 to 23 illustrate a modified means of securing a bearing for the screw-shaft on the movable member.

The body portion A consists of a handle member $a$ and jaw $b$, extending directly from the handle portion at one end, all in one homogeneous piece. At opposite edges of the body member are ribs $h\ h'$, forming channels on opposite sides of the body portion for receiving two parallel separated blades $d\ d$, extending from a head or jaw $c$, which, together with said blades, constitutes the sliding or movable member B of the wrench. Preferably the ribs $h\ h'$ are undercut or beveled at their inner guiding edges and adapted to corresponding edges of the blades $d\ d$. Thus each rib may have a narrow groove $i$, adapted to receive a rib extending from the adjacent edge of the blade $d$, as shown in Fig. 14. I prefer, however, to bevel the engaging edges of the blades and rib, as illustrated in Figs. 1 and 2. To facilitate the manufacture of this construction, the member A is made by first cutting a blank from a plate to the outline shown in Fig. 3, then milling the opposite faces or otherwise operating upon the blank to form the ribs $h\ h'$ and intermediate web $w$. The inner faces of the ribs are then undercut by a milling-tool, and a mandrel or plate $f$ is then inserted between the ribs on opposite sides of the web and the ribs are upset or otherwise forced on the inclined edges of the plate, as shown in Fig. 13, thereby imparting absolute precision to the undercut sides of the channels at the opposite sides of the wedge; but, if desired, the edges may be milled only without using the plate $f$.

By forming dovetailed channels on opposite sides of the web I not only guide the blades $d\ d$ of the sliding member, but I further prevent them from spreading apart and hold them firmly in place under the strains to which they are subjected when the wrench is in operation.

In making the movable member B, I cut a blank to the outline shape illustrated in Fig. 18 in any suitable way, and I mill or cut this blank so as to divide the shank, forming the two parallel separated blades $d\ d$. In some cases where the channels are undercut I bevel or otherwise form the edges of the parts $d\ d$ before or after dividing the blank to adapt them to fit the dovetailed channels in the opposite faces of the body member. I thus make each member of the wrench of a single homogeneous piece of metal without any of the weakness due to faulty connection of separated parts and avoiding the expense incident to connecting separated parts, thus reducing the cost of construction.

The two main parts of the wrench must of course be provided with means whereby they may be firmly secured in position after adjustment, and while I may employ any of the usual devices adapted for use in such cases I prefer to make use of means whereby a movable member may not only be secured, but may also be propelled or moved. To this end I prefer to make use of a revolving screw supported to turn without sliding by the body member and engaging a nut upon the sliding or movable member. As shown, the web of the body member is cut away to form a longitudinal opening $k$ with shoulders $s\,s$, against which abuts the cylindrical head $g$ of the screw C. This head may be secured to the head of the screw by a rivet, as shown in Fig. 1, in which case the body member is provided with an opening $j$ in the end, through which the screw may be passed into position in the opening $k$ and in the head $g$, after which the rivet is passed transversely through the head and to the screw; or the head may be formed integral with the screw and then centered by means of a pin passing through the opening $j$ into an opening in the head.

The sliding member B is provided with a longitudinal recess $p$, which may be made by boring longitudinally into the shank of the blank to any desired extent (or completely through the same) before the said blank is milled to separate the blades $d\,d$, so that after said separation the said recess is formed partly in each of the blades, as shown partly by dotted lines, Fig. 4. The recesses or channels thus formed should be sufficient to receive the thickest portion of the screw, but with a narrower threaded part $n'$ to engage the screw. The threads may be formed in the sliding member or in a part inserted in the sliding member.

Figure 20:
Figure 21:
Figure 22:
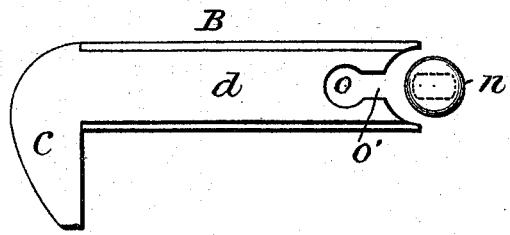
Figure 23:
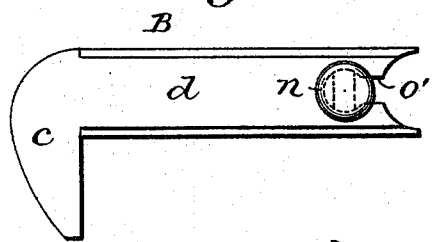

When the channels for receiving the blades $d\,d$ are not undercut, it is preferable to use means to prevent the blades from spreading, and this I may do by means of a nut $n$, which also serves as a connecting-piece to prevent the separation of the blades $d\,d$. As shown in Figs. 20 and 21, said nut is introduced into an opening $o$ in the blades $d\,d$, which opening has a circular inner part and narrow entrance. The nut has two heads of greater diameter than the opening $o$ and a shank adapted to the widest part of the opening, but so narrow in the other direction that it can just pass through the narrow part of the said opening, so that after being thus introduced the nut can be turned to bring the wide part of the shank to the position shown in dotted lines, Fig. 23, with the threaded opening (which is in the shank) in line with the axis of the screw C. When in position, the heads of the nut $n$ bear upon the outer faces of the blades $d\,d$ and hold them against separation.

It will be seen that while the sliding member is recessed to receive the screw C the recess is formed in the inner faces of the blades $d\,d$ without extending through the same, thereby preserving the continuity of the blades transversely and securing much greater strength and rigidity than would result if the blades were slotted longitudinally.

Without limiting myself to the precise construction shown, I claim—

1. In a wrench, the combination with a body member having longitudinal channels upon opposite sides with undercut edges, and provided with a jaw at one edge, of a movable member consisting of a head and a shank, said shank being slotted to form two separated plates parallel throughout and adapted to be introduced longitudinally into and fit the side channels of the body member, the edges of said plates conforming to the edges of the side channels whereby separation of the plates is prevented, and an adjusting device, substantially as described.

2. In a wrench, the combination with a body member having an opening in its end, longitudinal channels upon opposite sides, a jaw, at one edge and a central web provided with an opening contracted near one end to form shoulders, of a movable member having a jaw and parallel separated blades adapted to the channels of the body member, said member being also provided with a threaded opening, a screw extending through the openings in the web, the end of the body member and through that in the movable member, and a head upon said screw bearing upon the shoulders within the opening in the web, substantially as described.

3. The combination in a wrench, of a body member having side channels and a longitudinal opening, a screw supported in the opening to turn without moving longitudinally, a movable member having a jaw, and parallel separated plates provided with transverse openings for reception of a nut adapted to engage the screw, substantially as described.

4. In a wrench, the combination with a body member formed of a single homogeneous piece of metal and having longitudinal channels upon opposite sides, a jaw, and a central web provided with an opening contracted near one end to form shoulders, of a movable member formed with a jaw and with parallel separated blades adapted to the channels of the body member, said movable member being also formed with a screw-threaded opening, and a screw supported in the opening in the body member and engaging the threads of that in the movable member, and having a head bearing against the shoulders, substantially as described.

5. In a wrench the combination with a body member formed of a single homogeneous piece of metal and having longitudinal channels upon opposite sides, a jaw and a central web provided with an opening, of a movable member formed with a jaw and with parallel separated blades, adapted to the channels of the body member, said movable member being provided with a threaded opening and having the inner faces of its separated blades recessed in alinement with the threaded opening, and a screw provided with a head within the opening of the body member and engaging that of the movable member, substantially as described.

6. In a wrench, the combination with a body member, formed of a single homogeneous piece of metal and having an opening and a jaw, of a movable member formed with a jaw and with parallel separated blades adapted to extend upon opposite sides of the body member and provided with a transverse opening, a connecting-piece provided with a threaded opening and adapted to the opening in the separated blades, a screw within the opening in the body member, and engaging the opening in the connecting-piece, substantially as described.

7. In a wrench, the combination with a body member formed with a jaw and with an opening, of a movable member formed with a jaw and with parallel separated blades constituting the shank of the wrench and adapted to extend upon opposite sides of the body member, said blades being provided with a transverse opening having a contracted mouth, a nut of greater width than thickness adapted to the transverse opening, and a screw within the opening of the body portion engaging the nut, substantially as described.

In testimony whereof I have signed my name to this specification in the presence of two subscribing witnesses.

SIMON W. WARDWELL, JR.

Witnesses:
E. C. SMITH,
H. A. COOK.